United States Patent [19]

Cummings

[11] 4,019,496
[45] Apr. 26, 1977

[54] COLLECTING SOLAR ENERGY

[75] Inventor: Richard Daniel Cummings, Reading, Mass.

[73] Assignee: Daystar Corporation, Burlington, Mass.

[22] Filed: Apr. 7, 1975

[21] Appl. No.: 565,439

[52] U.S. Cl. .............................................. 126/271
[51] Int. Cl.$^2$ ............................................. F24J 3/02
[58] Field of Search ........... 126/270, 271; 237/1 A; 165/96, 100, 102, 135; 350/288, 299

[56] References Cited

UNITED STATES PATENTS

| 679,451 | 7/1901 | Baker | 126/271 |
|---|---|---|---|
| 921,976 | 5/1909 | Glass | 126/271 |
| 3,089,670 | 5/1963 | Johnson | 126/270 |

FOREIGN PATENTS OR APPLICATIONS

| 276,788 | 11/1965 | Australia | 126/270 |

*Primary Examiner*—Kenneth W. Sprague
*Assistant Examiner*—James C. Yeung

[57] ABSTRACT

In a solar-to-thermal energy converter comprising an insulated frame, a solar energy absorber mounted in the frame, fluid flow heat exchanger means thermally coupled to the absorber to carry away as thermal energy the absorbed solar energy, and a window transmissive to solar energy mounted in the frame and spaced from the absorber, that improvement consisting of a heat loss suppressor comprising a multiplicity of walls extending between the window and the absorber, adjacent walls being at least in part non-parallel to each other to define a first set of elongated channels generally diverging and opening toward the window interleaved with a second set of elongated channels generally diverging and opening toward the absorber, the walls being of materal transmissive to solar energy and absorptive of thermal energy, the channels being narrow enough to reduce conversion heat loss and deep enough to reduce radiation heat loss.

12 Claims, 5 Drawing Figures

COLLECTING SOLAR ENERGY

BACKGROUND OF THE INVENTION

The invention relates to heat traps in solar-to-thermal energy converters.

Various devices have been used in conjunction with solar energy absorbers to prevent loss by thermal radiation, convection, and conduction of the heat collected by the absorber. E.g., Buchberg et al., *Performance Characteristics of Rectangular Honeycomb Solar-Thermal Converters*, Solar Energy, Vol. 13, p. 193 (1971) describes a honeycomb structure between the absorber and a transparent window. The honeycomb cells are small enough to limit convection, and the honeycomb walls are thermally absorptive to limit radiation. Experimental work has been done modifying the honeycomb approach by using closely spaced parallel walls running perpendicular to the window to provide long narrow channels which limit losses in a manner similar to the honeycomb cells but which, if arranged with the channels extendng along the east-west travel direction of the sun, interfere less with transmission of the solar energy to the absorber. Additional windows, parallel to the outer window, have also been tried; these inhibit convection but have the disadvantage of seriously interfering with transmission by reflecting substantial light away from the absorber.

SUMMARY OF THE INVENTION

The invention makes possible highly efficient solar-to-thermal energy conversion by providing for highly effective inhibition of radiation and convection losses of thermal energy, while maximizing transmission of solar energy to the absorber. A heat trap is provided which is durable, reliable, dimensionally stable at operating temperatures, and easily and inexpensively manufactured.

In general the invention features, in a solar-to-thermal energy converter comprising an insulated frame, a solar energy absorber mounted in the frame, fluid flow heat exchanger means thermally coupled to the absorber to carry away as thermal energy the absorbed solar energy, and a window transmissive to solar energy mounted in the frame and spaced from the absorber, that improvement consisting of a heat loss suppressor comprising a multiplicity of walls extending between the window and the absorber, adjacent walls being at least in part non-parallel to each other to define a first set of elongated channels generally diverging and opening toward the window interleaved with a second set of elongated channels generally diverging and opening toward the absorber, the walls being of material transmissive to solar energy and absorptive of thermal energy, the channels being narrow enough to reduce convection heat loss and deep enough to reduce radiation heat loss. In preferred embodiments the suppressor is a sheet of the material folded in zig-zag form to form the channels between adjacent folds, the depth of the channels is at least three times (and most preferably at least ten times) and no more than twenty times their maximum width, the maximum channel width is no more than ⅜ inch, the sheet has peripheral flanges connected to the frame and the fold lines at the closed ends of the channels of the second set contact the window, and the frame has internal side walls which converge along the direction from the window toward the absorber. The invention is applicable to all temperature ranges, e.g., flat plate collectors designed to operate below 400° F. and concentrating collectors designed to operate above 500° F.

Other advantages and features of the invention will be apparent froam the description and drawings herein of a preferred embodiment thereof.

DESCRIPTION OF THE PREFERRED EMBODIMENT

Figure 1:
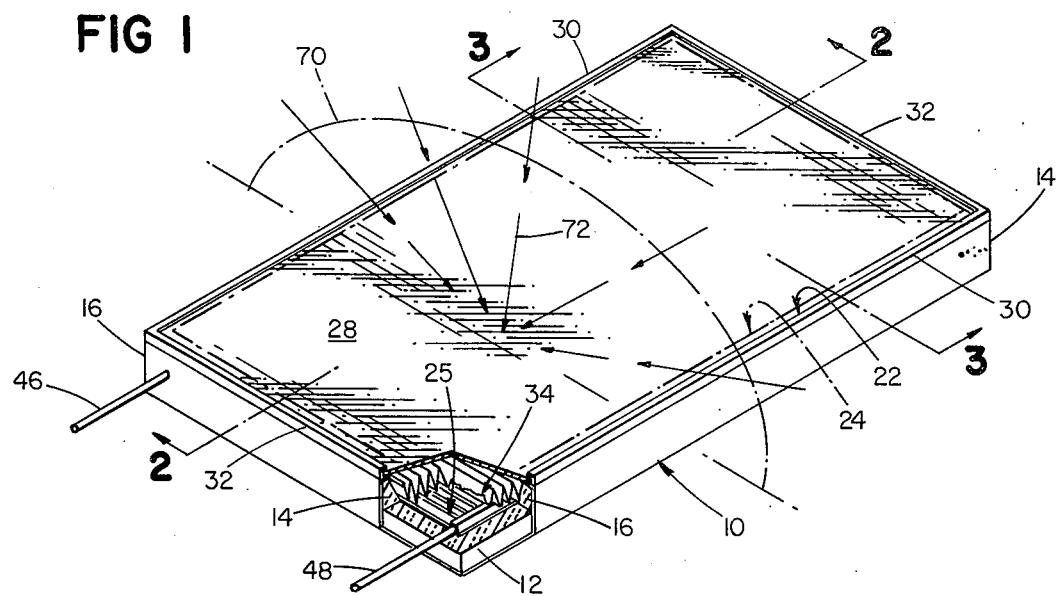
FIG. 1 is a perspective view partially broken away of a flat plate collector embodying the invention.

Referring to the drawings, rectangular 4 × 7 foot frame 10 has an insulated bottom 12 and insulated sides 14, 16 with sloping interior side walls 18, 20 to provide a window area 22 (FIG. 1) larger than the exposed bottom area 24, increasing efficiency. Heat absorber 25 is mounted on bottom 12, with its periphery retained in frame recess 26. Transparent window 28, with channel supports 30, 32 along its edges, is mounted on top of the frame over window area 22. Pleated trap 34 is mounted between the window and the absorber.

Absorber 25 has black surfaces to absorb the solar energy passing through window 28. Channels 40 are connected to manifolds 42 and 44 which in turn feed inlet and outlet conduits 46 and 48 to permit liquid circulation through the absorber to transfer heat absorbed to a point of use.

Figure 4:
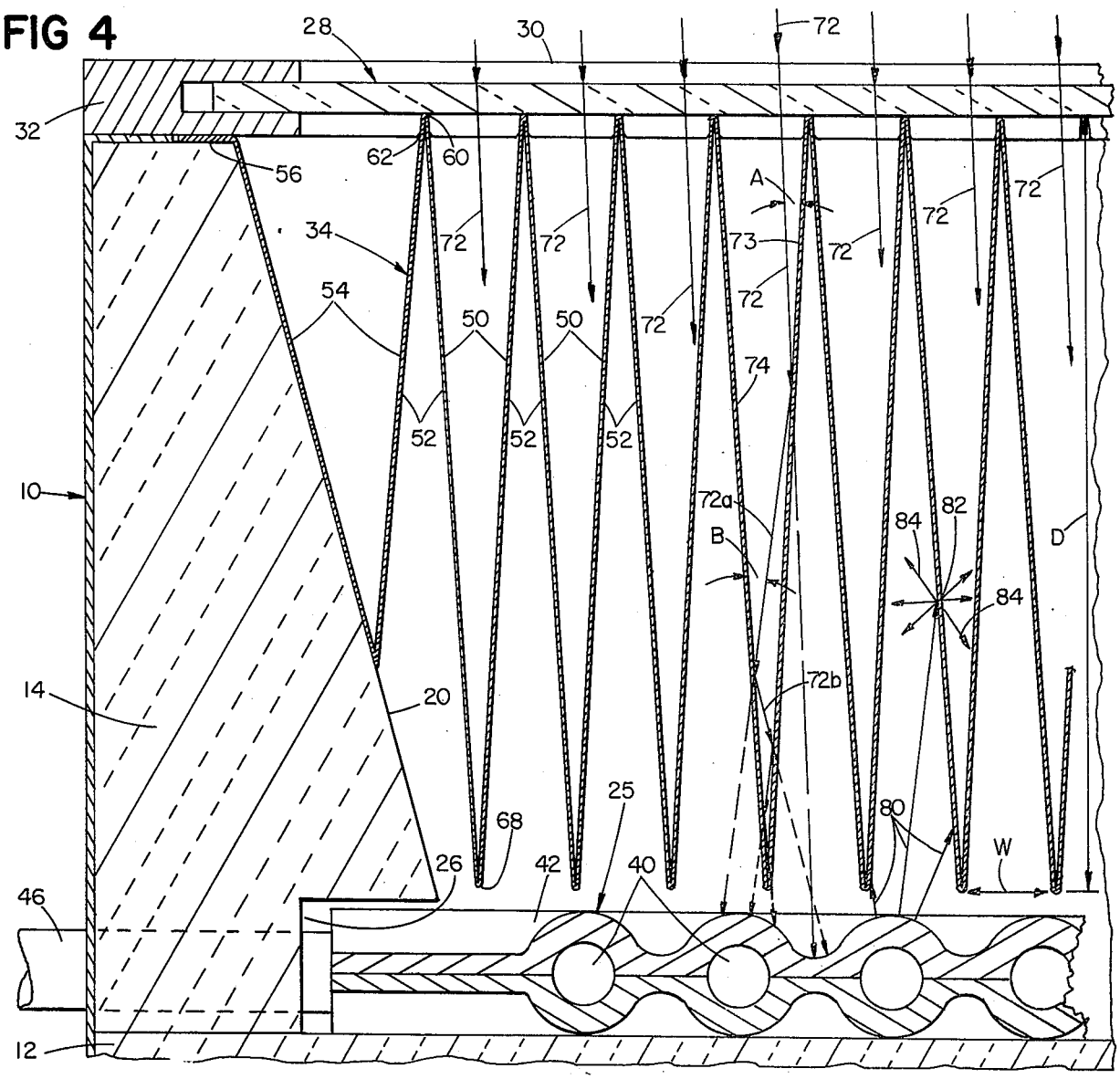
FIG. 4 is an enlarged view of a fragment of FIG. 2.
Figure 2:
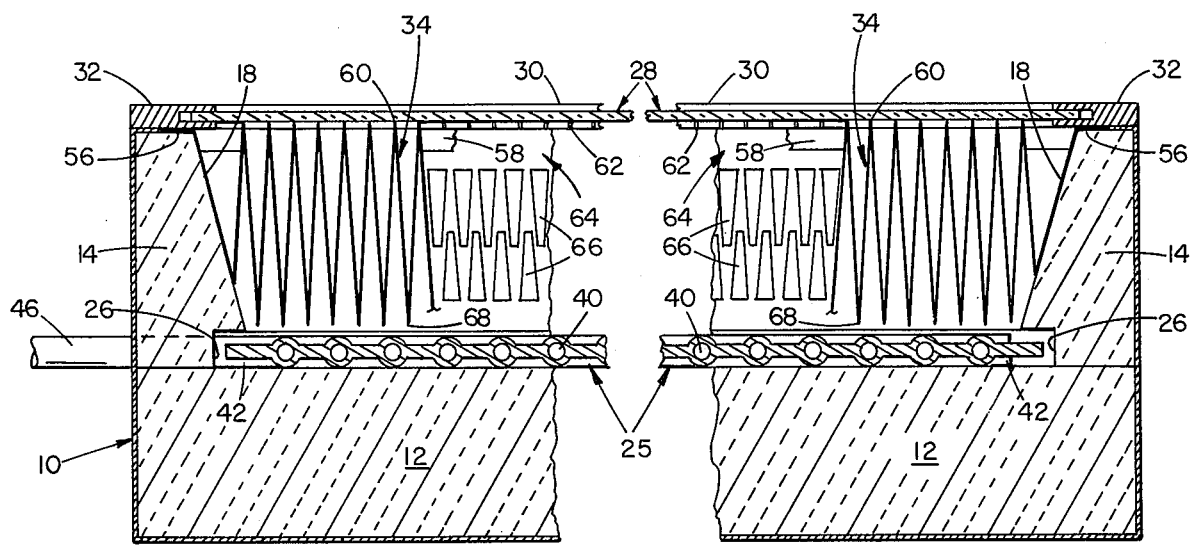
FIGS. 2 and 3 are sectional views partially broken away taken respectively along 2—2 and 3—3 of FIG. 1.
Figure 3:
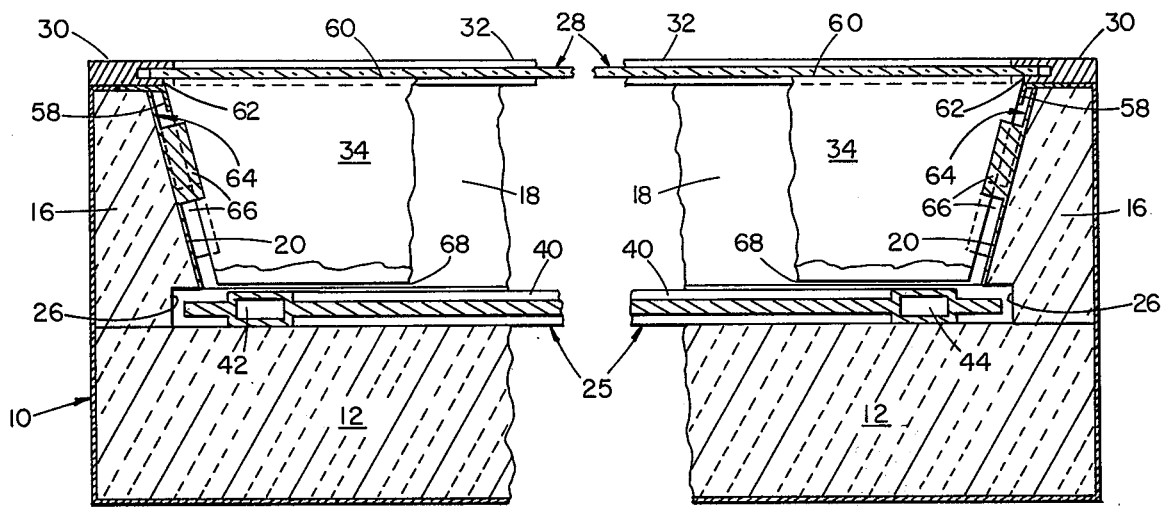

Trap 34 is of plastic material highly transmissive of light energy and highly absorptive of heat energy. It is pleated to form one set of wedge-shaped channels 50 which diverge and open toward window 28, and a second set of wedge-shaped channels 52 which are interleaved with channels 50 and which diverge and open toward absorber 25. The end pleats 54 are shallower than the rest, lie along walls 20, and have flaps 56 (FIGS. 2, 4) sandwiched between the frame and channels 32. Similar flaps 58 (FIG. 3) are attached to the long sides of the trap near its top and are sandwiched between the frame and channels 30. In this way the upper vertices 60 of the trap are held against the window 28. Slots 62 (FIGS. 2, 4) are provided in channels 30 to receive vertices 60. Spacers 64 (FIG. 3) are mounted on walls 18 and have lugs 66 to fit between adjacent pleats. There spacers cooperate with slots 62 to maintain the pleated geometry of the trap. Lower vertices 68 of the trap are spaced sufficiently above the absorber to allow for temperature-induced expansion during use.

The dimensions of the pleats are of importance for optimum operation. The maximum width W of channels 52 and 50 should be less than ⅜ inch to prevent natural convection cells from developing. The depth D of the channels should be between three and twenty times (and preferably at least 10 times) W to suppress re-radiation through window 28 of heat once absorbed by absorber 25.

The embodiment shown in FIGS. 1–4 is designed to operate as a flat plate collector in the low temperature (e.g., below 400° F.) region. It is preferably installed so that channels 50 extend generally parallel to the east-west arc 70 (FIG. 1) swept by the sun's rays during the day. In operation, most incoming rays 72 (FIG. 4) will strike a surface 73 of trap 34 at a small acute angle A. The major component of the ray will be transmitted toward the absorber. The small reflected components 72a will also head toward the absorber because of the small value of A, which is also the angle of reflection. Ray 72a will hit the opposite wall 74 at another small acute angle B, and, again, most of that ray will be transmitted to the absorber with a small component 72b being reflected back to surface 73. Successive such interactions occur in each converging channel 50, until virtually the entire energy in the incoming rays reaches the absorber. As a fraction of the absorbed heat is radiated back from the absorber into channels 52 along lines 80, it is absorbed by the channel walls, e.g. at 82. A fraction of that heat absorbed at 82 is symmetrically re-radiated along lines 84, again to be absorbed by the trap walls. In this way, the spectrally selective transmissive-absorptive qualities of the trap material, along with the geometry of the interleaved channels, provides for retention in the collector of a very high percentage of the incoming light.

The efficiency of the collector is even further increased by the convection suppression function of trap 34. In the first place, because the trap is formed from a continuous sheet of material it forms a virtually complete convection barrier across the collector between the window and the absorber. In this sense it offers the advantages of a second window without its disadvantages. In the second place, the narrow width of channels 52 provides insufficient space for generation of natural convection cells.

Figure 5:
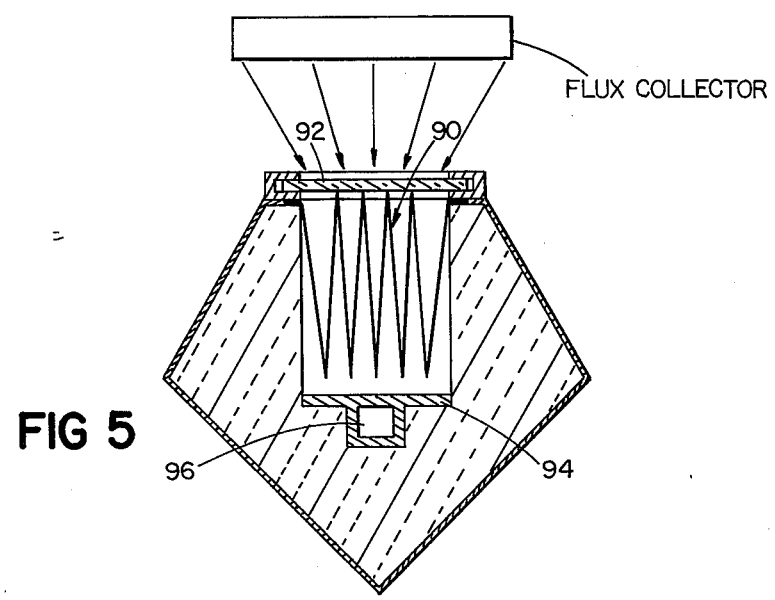
FIG. 5 is a cross-sectional view of the absorber section of a concentrating collector embodying the invention.

The trap of the invention can also be used in a high temperature (e.g., over 500° F.) concentrating type collector (see, e.g., U.S. Pat. No. 3,869,199), as shown in FIG. 5, where trap 90 is interposed between window 92 and absorber 94 adjacent liquid conduit 96.

Other embodiments are within the following claims.

What is claimed is:

1. In a solar-to-thermal energy converter comprising an insulated frame, a solar energy absorber mounted in said frame, fluid flow heat exchanger means thermally coupled to said absorber to carry away as thermal energy the absorbed solar energy, and a window transmissive to solar energy mounted in said frame and spaced from said absorber, that improvement consisting of a heat loss suppressor comprising a multiplicity of walls extending between said window and said absorber, adjacent said walls being at least in part non-parallel to each other to define a first set of elongated channels generally diverging and opening toward said window interleaved with a second set of elongated channels generally diverging and opening toward said absorber, said walls being of material transmissive to solar energy and absorptive of thermal energy, adjacent said walls being at an acute angle to each other so that, (a) when said converter is installed with said channels extending generally parallel to an east-west arc, incoming sun rays passing through said window and impinging upon said walls will be split into a major transmitted component directed toward said absorber and a minor reflected component also directed toward said absorber, (b) said channels will be narrow enough to substantially reduce convection heat loss, and (c) said channels will be deep enough to substantially reduce radiation heat loss.

2. The improvement of claim 1 wherein said walls are planar.

3. The improvement of claim 1 wherein the adjacent walls defining each said channel meet at an acute angle to close the channel at one end.

4. The improvement of claim 1 wherein said walls are formed by a continuous sheet of said material forming a continuous convection barrier between said absorber and said window.

5. The improvement of claim 1 wherein said suppressor is a sheet of said material folded in zig-zag form to form said channels between adjacent folds.

6. The improvement of claim 1 wherein the depth of said channels is at least three times and no more than twenty times their maximum width.

7. The improvement of claim 6 wherein said depth is at least 10 times said width.

8. The improvement of claim 6 wherein said maximum width is no more than ⅜ inch.

9. The improvement of claim 5 wherein said sheet has peripheral flanges connected to said frame and the fold lines at the closed ends of said channels of said second set contact said window.

10. The improvement of claim 1 wherein said converter comprises a flat plate collector designed to operate below 400° F.

11. The improvement of claim 1 wherein said converter comprises the absorber section of a concentrating collector designed to operate above 500° F.

12. The improvement of claim 1 wherein said frame has internal side walls which converge along the direction from said window toward said absorber.

* * * * *

UNITED STATES PATENT AND TRADEMARK OFFICE
CERTIFICATE OF CORRECTION

PATENT NO. : 4,019,496

DATED : April 26, 1977

INVENTOR(S) : Richard Daniel Cummings

It is certified that error appears in the above-identified patent and that said Letters Patent are hereby corrected as shown below:

In the abstract:

Line 17, "conversion" should be --convection--.

Col. 1, line 5, "The" should be --This--.

Col. 1, line 22, "extendng" should be --extending--.

Col. 2, line 5, "froam" should be --from--.

Col. 2, line 54, "There" should be --These--.

Signed and Sealed this twenty-sixth Day of July 1977

[SEAL]

Attest:

RUTH C. MASON
Attesting Officer

C. MARSHALL DANN
Commissioner of Patents and Trademarks